United States Patent [19]

Stenkvist

[11] Patent Number: 4,612,650
[45] Date of Patent: Sep. 16, 1986

[54] DC ARC FURNACE
[75] Inventor: Sven-Einar Stenkvist, Västerås, Sweden
[73] Assignee: Asea AB, Västerås, Sweden
[21] Appl. No.: 719,965
[22] Filed: Apr. 4, 1985
[30] Foreign Application Priority Data
  Apr. 16, 1984 [SE] Sweden ................................ 8402101
[51] Int. Cl.⁴ ............................................. H05B 7/00
[52] U.S. Cl. .................................... 373/108; 373/102
[58] Field of Search .............. 373/102, 103, 104, 105, 373/106, 107, 108, 99, 98

[56] References Cited
FOREIGN PATENT DOCUMENTS
  458588  1/1975  U.S.S.R. ................................. 373/99

Primary Examiner—Roy N. Envall, Jr.
Attorney, Agent, or Firm—Kenyon & Kenyon

[57] ABSTRACT

A DC arc furnace comprising a furnace vessel having a hearth and a side wall extending upwardly from the hearth, conductive means for conducting DC through the hearth from its outside to a melt in the hearth, an arcing electrode, a substantially horizontal arm having a holder holding the electrode substantially vertically above the hearth, a substantially vertical mast from which the arm extends, and means for connecting DC positively to the conductive means and negatively to the electrode so as to form an arc between the electrode and the melt and producing an arc flare to which the side wall is exposed; wherein the improvement comprises means for connecting the arm to the mast so as to permit the arm to be adjustably moved longitudinally to different positions and means for mounting the mast so it can be adjustably rotated to different positions about its axis, whereby the electrode and its arc can be located at different positions horizontally to the side wall.

1 Claim, 2 Drawing Figures

U.S. Patent   Sep. 16, 1986   4,612,650
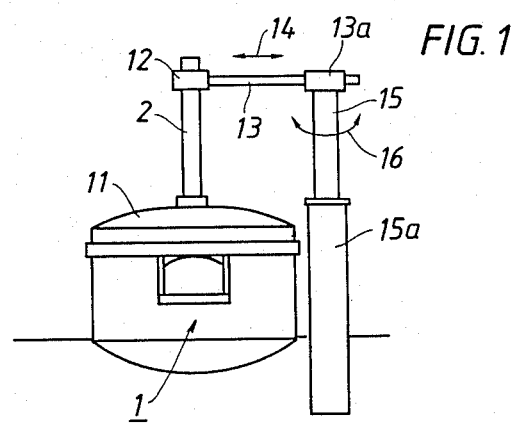
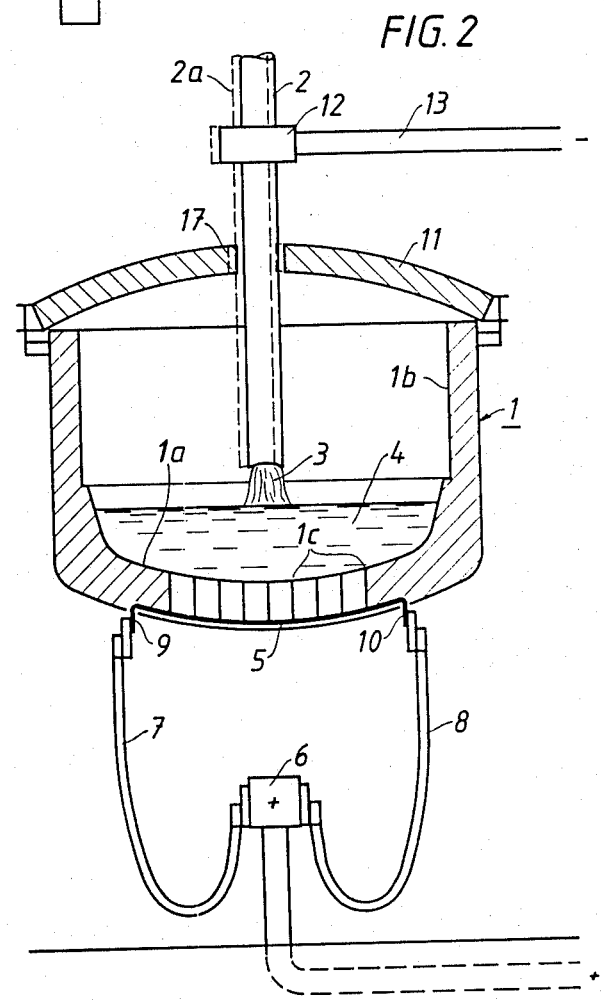

DC ARC FURNACE

FIELD OF THE INVENTION

This invention relates to DC arc furnaces of the type basically formed by a furnace vessel having a hearth and a side wall extending upwardly from the hearth, and a removable roof for the side wall, conductive means for conducting DC to a melt in the hearth from the outside of the hearth and an arcing electrode depending through an electrode hole in the roof vertically above the hearth. Means are provided for connecting DC positively to the conductive means and negatively to the electrode to form an arc between the electrode and the melt and incidentally forming an arc flare to which the side wall is exposed.

BACKGROUND OF THE INVENTION

The prior art has recognized that if the arc burns angularly instead of vertically in alignment with the arcing electrode, the arc flare is directed more intensely against the side wall, in the direction of the arc angularity, so as to result in premature destruction of the area of the side wall that is affected. This has led to a number of proposals for insuring that the arc burns vertically in alignment with the arcing electrode.

One example of such a proposal is exemplified by the Lassander and Stenkvist U.S. Pat. No. 4,403,328. Another proposal is embodied by the Bergman and Stenkvist patent application Ser. No. 622,589, this proposal being described hereinafter in connection with disclosing the present invention. Such proposals have been generally effective in providing for the arc burning vertically.

Normally the arcing electrode is positioned concentrically with the furnace side wall and hearth both of which are as symmetrically circular as furnace construction techniques permit. Therefore, with the arc burning vertically on the axis of the furnace it has been assumed that the arc flare should be uniformly distributed circumferentially against the side wall so as to provide uniform side wall life, avoiding a premature furnace shut-down as is required even if the side wall is only locally destroyed at one place. Unfortunately this assumption has not proven to be entirely correct, localized side wall destruction being experienced although the arc burns vertically.

The object of the present invention is to provide some means for effecting what might be called a fine tuning of such a furnace to prevent subsequent localized side wall destruction after it initially occurs in the furnace working under commercial production conditions.

SUMMARY OF THE INVENTION

Basically the present invention comprises holding the arcing electrode by a horizontal electrode arm which can be moved longitudinally to different positions, and mounting the electrode arm on a vertical mast that can be adjustably rotated to different positions about its axis. The electrode depends vertically from the arm and can be shifted slightly in any horizontal direction required to prevent the arc flare from concentrating on any one localized portion of the furnace side wall. The effect obtained may be small but it is to be assumed that the furnace design and the arrangement of its electric conductors carrying arcing current follows one or more of the prior art proposals for insuring that the arc burns substantially in axial alignment with the vertical electrode normally on the axis of the furnace hearth and side wall.

The concept is that after the furnace has been in operation and a localized wall effect has been noted, slight horizontal shifting of the electrode and its arc away from the zone involved provides correction by a fine tuning effect. Consequently when the furnace is returned to operation the side wall life should be uniform throughout the circumference of the side wall.

DESCRIPTION OF THE ACCOMPANYING DRAWINGS

FIG. 1 in elevation shows the main components of a DC arc furnace, with arrows indicating the mast and electrode arm movements referred to; and FIG. 2 in vertical cross section shows one preferred embodiment of the invention.

DETAILED DESCRIPTION OF THE INVENTION

The drawings somewhat schematically show a DC arc furnace 1, having a circular hearth 1a and a cylinder side wall 1b extending upwardly from the hearth. The hearth has a concentric symmetrical array of electrical conductors 1c extending through it and may be made as described by U.S. Pat. No. 4,228,314 or U.S. Pat. No. 4,324,943. An arcing electrode 2 is positioned normally on the axis of the furnace vessel hearth and side wall so as to form an arc 3 with a melt 4 in the hearth 1a. The hearth conductors 1c are electrically connected at their bottoms with an electrically conductive plate 5 having end terminals 9 and 10 symmetrically arranged relative to the arcing electrode.

In accord with the principles of the invention disclosed and claimed by the Bergman and Stenkvist patent application Ser. No. 622,589, the positive current lead for the furnace is shown as a vertical leg 6 positioned far enough below the furnace hearth 1 to avoid its magnetic field from having any appreciable effect on the vertical burning of the arc 3. Symmetrically arranged flexible cables 7 and 8 connect the upper end of the leg 6 with the electrical connections or terminals 9 and 10 of the plate 5 in electrical connection with the hearth's electrical conductors 1b. The lead 6 extends downwardly and horizontally to an unillustrated positive connection with the usual thyrister converter providing a source of DC current. Assuming the furnace to be of the tilting type the flexible cables 7 and 8 permit the tilting operation. The positive connection can be assumed to be to the arcing electrode 2 to provide a circuit including the arc 3.

With the above arrangement of the electrical parts the arc 3 should normally burn vertically and distribute its arc flare uniformly around the inside of the furnace side wall 10. However, in some instances localized side wall damage occurs. Apparently unavoidable asymmetries in the furnace construction and the conductors leads to the localized side wall destruction. The side wall wear can be extensive enough to require replacement of the side wall lining while other portions of the side wall remain serviceable.

There is no way to predict accurately the exact location where such local destruction or high wear will occur, excepting by operation of the furnace until the wear or destruction occurs. When this does happen and side wall lining repair or replacement is undertaken, there has not previously been any way to provide correction.

Conventionally the furnace has a roof 11 peripherally resting on the top rim of its side wall 1a and this roof is removable to give access to the inside of the side wall. Although nor illustrated the furnace hearth and side wall are normally encased by a steel plate shell enclosing the side wall which is made as a refractory construction normally referred to as a lining.

The arcing electrode 2 is held by the conventional electrode holder 12 on the end of the horizontal electrode arm 13 which in the present case is uniquely adjustably movable longitudinally to different positions as indicated by the arrow 14. The usual vertical mast 15 is supported vertically by an actuator 15a which provides for the usual vertical motion required for adjustment of the electrode 2 relative to the melt 4, but in this case there is the difference that the mast 15 is adjustably rotative about its axis as indicated by the arrow 16 in FIG. 1.

The horizontal electrode arm 13 can be positioned adjustably in its longitudinal direction by a fixture 13a on the top end of the mast 15 and the rotative adjustment of the mast 15 in the direction of the arrow 16 can be provided by adjusting equipment. These details are within the skill of the art once the concept of this invention is available.

In FIG. 2 by the dashed lines 2a it is shown how the electrode 2 can be adjusted slightly, in the left-hand direction in this case, so as to reduce its flare action against the opposite inside of the side wall 1a where it can be assumed excessive destruction or wear of the furnace wall has become noticeable after the furnace is shut down and its side wall inspected. Although such localized damage should not be expected in view of the arrangement of the electrical parts, it does occur under commercial operation conditions of the furnace. The extent to which the arcing electrode is moved away from the damaged portion depends to some extent on experience, but even a slight movement away from the damaged portion provides for an improvement. It is to be noted that during the adjustment motion the arcing electrode remains vertically positioned and starting with an initial design position concentrically with the furnace hearth and side wall and on the center line of the furnace, the electrode need only be shifted horizontally in the indicated position to provide improved side wall service life throughout the circumferential extent of the side wall.

As the furnace is initially built it is to be assumed that the arcing electrode 2 is positioned on the axis of the furnace, it following that the electrode hole 17 in the usual removable roof 11 is correspondingly positioned. Normally the electrode hole would be provided with an electrode seal to prevent the escape of gases around the electrode 17. When the roof 11 is removed for repair of the furnace including its side wall lining and possible replacement of this lining, the electrode arm 13 and mast 15 can be adjustably positioned to reposition the electrode to a new location indicated as changing the direction of maximum flare projection just enough to provide for a more even side wall life. In such an event the old electrode hole in the roof 11 is no longer accurately positioned. However, during this servicing time it is customary to replace the roof lining and perhaps its usual steel supporting structure as well. Therefore, at this time it is not unduly expensive to reconstruct the roof, or provide a new roof, with an electrode hole properly positioned to accomodate the new positioning of the electrode.

What is claimed is:

1. A DC arc furnace comprising a furnace vessel having a hearth and a side wall extending upwardly from the hearth, conductive means for conducting DC through the hearth from its outside to a melt in the hearth, one arcing electrode, a substantially horizontal arm having a holder holding the electrode substantially vertically above the hearth, a substantially vertical mast from which the arm extends, and means for connecting DC positively to the conductive means and negatively to the electrode so as to form an arc between the electrode and the melt and producing an arc flare to which the side wall is exposed; wherein the improvement comprises means for connecting the arm to the mast so as to permit the arm to be adjustably moved longitudinally to different positions thus moving the arcing electrode parallel to itself into different positions in relation to the side wall and means for mounting the mast so it can be adjustably rotated to different positions about its axis, whereby the electrode and its arc can be located at different positions horizontally to the side wall.

* * * * *